United States Patent [19]

Hewko

[11] 4,181,030

[45] Jan. 1, 1980

[54] SPEEDOMETER DRIVE ARRANGEMENT

[75] Inventor: Lubomyr O. Hewko, Port Clinton, Ohio

[73] Assignee: General Motors Corporation, Detroit, Mich.

[21] Appl. No.: 738,602

[22] Filed: Nov. 3, 1976

[51] Int. Cl.² .................. F16H 37/02; F16H 15/08
[52] U.S. Cl. ........................................ 74/12; 74/196
[58] Field of Search .............. 74/12, 194, 196, 201, 74/198, 199, 200, 202, 206; 403/378, 379

[56] References Cited

U.S. PATENT DOCUMENTS

| | | | |
|---|---|---|---|
| 965,131 | 7/1910 | Bliss | 403/379 |
| 1,010,804 | 12/1911 | Robinson | 74/196 |
| 1,232,349 | 7/1917 | McSorley | 74/196 |
| 1,234,007 | 7/1917 | George | 74/196 |
| 1,251,784 | 1/1918 | Joslin | 74/194 |
| 1,317,916 | 10/1919 | Ford | 74/196 |
| 1,329,867 | 2/1920 | Wenderhold | 74/196 |
| 1,421,641 | 7/1922 | White | 74/196 |
| 1,431,049 | 10/1922 | Schoonmaker | 74/196 |
| 1,460,524 | 7/1923 | Whittington | 74/12 |
| 1,702,044 | 2/1929 | Flanders | 74/196 |
| 1,894,308 | 1/1933 | Fleischmann et al. | 74/194 |
| 1,981,910 | 11/1934 | Ehrlich | 74/196 |
| 2,350,682 | 6/1944 | Hoehn et al. | 74/194 |
| 2,527,203 | 10/1950 | Tippen | 74/194 |
| 2,537,559 | 1/1951 | Tippen | 74/196 |
| 3,264,890 | 8/1966 | Erban | 74/196 |
| 3,390,897 | 7/1968 | Moore | 403/379 |
| 3,727,473 | 4/1973 | Bayer | 74/198 |
| 3,892,134 | 7/1975 | Hewko | 74/12 |
| 3,892,135 | 7/1975 | Hewko | 74/12 |
| 3,896,676 | 7/1975 | Walters | 74/12 |
| 3,930,437 | 1/1976 | Guntert | 403/379 |
| 4,006,643 | 2/1977 | Hewko | 74/12 |

Primary Examiner—Samuel Scott
Assistant Examiner—William R. Henderson
Attorney, Agent, or Firm—John P. Moran

[57] ABSTRACT

A continuously variable speedometer drive adapter including a housing with input and output shafts rotatably mounted therein, a first race secured to one of the shafts, a spring-loaded second race mounted freely around the same shaft, a pair of spacer balls mounted therebetween, a drive roller formed on the other shaft and frictionally confined between the races, and adjustment means for varying the position of the roller along the races to thereby vary the resultant input/output speed ratio. In an alternate embodiment, the races are operatively connected to the housing, as well as to one of the shafts, to provide a basic 2:1 input/output speed ratio to supplement the variable ratio feature.

2 Claims, 7 Drawing Figures

SPEEDOMETER DRIVE ARRANGEMENT

This invention relates generally to automotive speedometer drive arrangements and more particularly, to a continuously variable drive adapter for use with a transmission output shaft or a governor drive shaft.

Generally, automotive speedometers are driven from the transmission output shaft by a pair of crossed-axis gears and a flexible cable, or by geared adapters operatively connected thereto. Because a pair of gears has only one finite drive ratio, it is necessary to use different gears for each of countless combinations of tire sizes and axle ratios, with the attendant production and service difficulties of having to maintain a large gear inventory. Additionally, because of normal tire wear and dimensional tolerances of tire diameters, the resultant speed indicated by a conventional speedometer can be in error.

Currently, drive ratio adjustment is not generally available, and yet speedometer accuracy requirements are becoming increasingly more stringent and, hence, extremely difficult to maintain over the life-time of an automobile.

Accordingly, a general object of the invention is to provide an improved speedometer drive adapter for use with a transmission output shaft or a governor drive shaft, wherein initial and periodic adjustment of the transmission output or governor drive shaft to speedometer take-off shaft speed ratio is readily and accurately accomplished.

Another object of the invention is to provide a continuously variable traction-drive adapter unit operatively connected to the transmission output shaft or governor drive shaft for driving a speedometer take-off shaft, wherein the speed ratio of the driving shaft and speedometer take-off shaft may be varied infinitely between predetermined limits by a manual adjustment operation.

A further object of the invention is to provide an improved infinitely or continuously variable speedometer drive adapter whose input shaft is driven by the transmission output shaft or by the governor drive shaft, and which includes race and roller means adapted to permit adjustment of the speed ratio between the transmission output shaft or the governor drive shaft and the speedometer power take-off shaft, particularly during final test of the automobile on a roll dynamometer, for example, at the end of an assembly line. Thus, the speed ratio would be adjusted for the exact axle ratio and tire size as installed in the specific vehicle. The accuracy of speed indication thus established could be maintained during the life of the automobile through periodic adjustments of the inventive continuously variable drive adapter.

Still another object of the invention is to provide a continuously variable speedometer drive adapter including a housing with input and output shafts rotatably mounted therein, a first race secured to one of the shafts, a spring-loaded second race mounted around the same shaft, a pair of spacer balls mounted therebetween, a drive roller formed on the other shaft and frictionally confined between the races, and adjustment means for varying the position of the roller along the races to thereby vary the resultant input/output speed ratio.

A still further object of the invention is to provide an alternate continuously variable speedometer drive adapter embodiment including a housing with input and output shafts rotatably mounted therein, a first spring-loaded race secured to a wall of the housing, a second spring-loaded race operatively connected between an opposite wall and the output shaft and providing a 2:1 input/output speed ratio; a pair of spacer balls mounted between the races, a drive roller formed on the input shaft and frictionally confined between the spring-loaded races, and adjustment means for varying the position of the roller along the races to thereby vary the resultant input/output speed ratio, supplementing the basic 2:1 ratio.

These and other objects and advantages of the invention will be apparent when reference is made to the following description and accompanying drawings, wherein.

Figure 1:
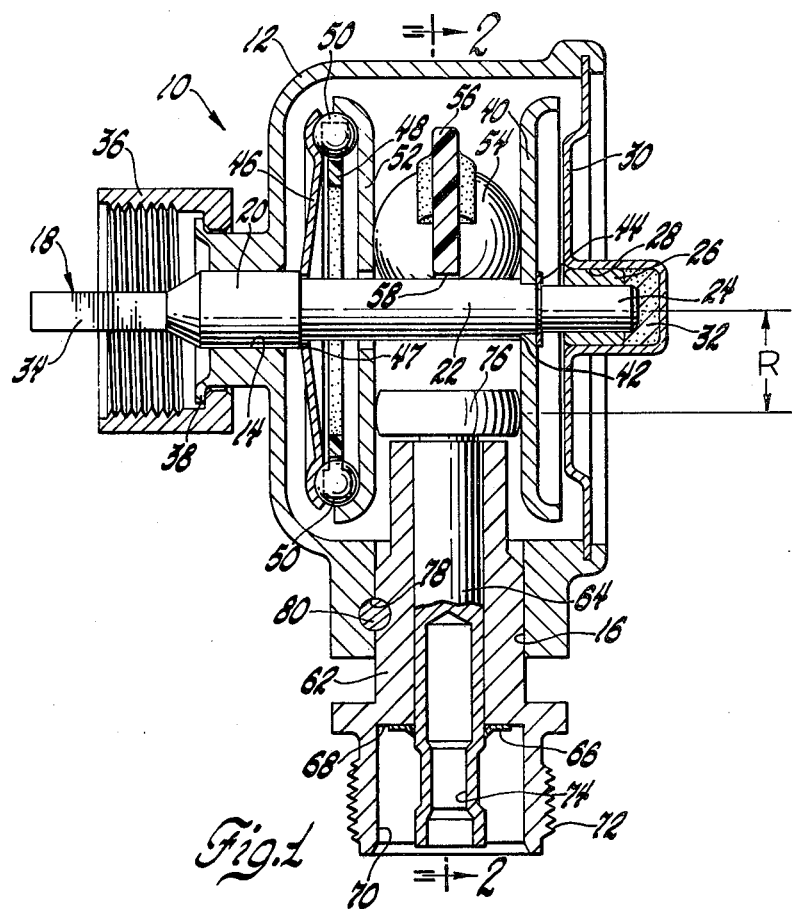
FIG. 1 is a cross-sectional view of an adapter unit embodying the invention.
Figure 2:
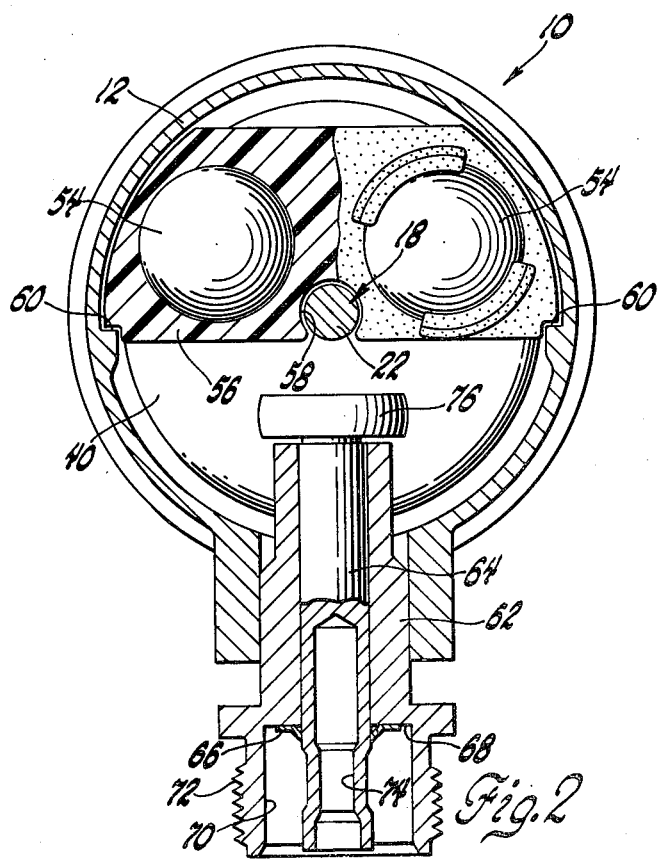
FIG. 2 is a cross-sectional view taken along the plane of line 2—2 of FIG. 1, and looking in the direction of the arrows.

Referring now to the drawings in greater detail, FIG. 1 and 2 illustrate a speedometer drive adapter unit 10, adapted to being operatively connected to a suitable driving member, such as a transmission output shaft (not shown) or a governor drive shaft (not shown). The adapter unit 10 includes a housing 12, having first and second openings 14 and 16, respectively, formed therein. An input shaft 18 includes a largest diameter portion 20 rotatably mounted in the first opening 14, and reduced diameter portions 22 and 24 extended through the housing 12, with the smallest diameter end portion 24 thereof rotatably supported in a bushing 26 confined in a pocket 28 formed in a cover portion 30 of the housing 12. A suitable lubricant 32 is contained in the pocket 28 adjacent the ends of the bushing 26 and the shaft end portion 24. A square or other drive shaped end portion 34 extends outwardly from the largest diameter shaft portion 20. An internally threaded connector member 36 is secured to a flanged portion 38 of the housing 12, as a means for connecting the adapter 10 to a driving means, such as a transmission extension housing (not shown), wherein the square end portion 34 may be operatively connected to an associated transmission output shaft (not shown).

A flat-surfaced race 40 is mounted around the inner shaft end portion 24, and secured against the shoulder 42 between the shaft portions 22 and 24 by a retainer ring 44. A belleville spring 46 is mounted freely around the shaft portion 22 adjacent the shoulder 47 between the shaft portions 20 and 22. A carrier member 48 having equally spaced balls or thrust bearings 50 contained around the outer periphery thereof is confined between the belleville spring 46 and a second flat-surfaced race 52, the latter also mounted freely around the shaft portion 22.

A pair of spacer balls 54 of a predetermined diameter are rotatably mounted between the races 40 and 52, preloading the belleville spring 46. The balls 54 are retained radially by a resilient cage 56 having a central grooved portion 58 (FIG. 2) which fits freely around more than half of the peripheral surface of the shaft portion 22. The cage 56 is retained from rotating within the housing 12 by shoulders 60 formed on opposite side walls of the housing 12.

A sleeve member 62 is inserted through the opening 16, into the housing 12, to a depth to be explained. An output shaft 64 is rotatably mounted through the sleeve member 62, and retained axially relative thereto by a self-locking retaining ring 66 operatively connected between the shaft 64 and the shoulder 68 of a counterbore 70 formed in the exposed end of the sleeve member 62. External threads 72 are formed on the end of the sleeve member 62 suitable for connection to a conventional speedometer casing (not shown). A square or other drive-type opening 74 is formed in the exposed end of the output shaft 64 for the connection therewith of a speedometer cable (not shown).

A drive roller 76 is secured to the inner end of the output shaft 64, just beyond the inner end of the sleeve member 62 and frictionally confined between the races 40 and 52. In operation, the speed ratio between the input and output shafts 18 and 64, respectively, will vary, depending upon the distance R, or the radius as measured along the race 40 from the axis of the input shaft 18 to the point where the traction drive of the roller 76 is effective. For rear wheel-driven vehicles, wherein the input to the adapter 10 is typically from the transmission output shaft via gear means, the input/output speed ratio range suitable for most vehicles is in the order of 1.300 to 0.733:1.

As indicated above, a particular drive ratio, depending upon axle ratio and tire size, is determined during the final tests of a vehicle at the end of the assembly line. Once determined, the exact desired ratio may be obtained by sliding the sleeve member 62, and its associated output shaft 64, in or out of the opening 16 in the housing 12 as required. This sets the drive roller 76 along the surface of the race 40 at a particular distance R from the axis of the input shaft 18 corresponding to the desired ratio.

Once the location of the roller 76 is established, it is essential that such location be retained. In this regard, a hole 78 may be drilled in the housing 12 such that it penetrates a portion of the outer surface of the sleeve member 62. A pin 80 is then inserted in the drilled hole 78, securing the sleeve member 62 relative to the housing 12. Should the tire size subsequently change, the pin 80 may be removed, the sleeve member 64 slid further in or out to change the roller 76 location, a new hole 78 drilled, and the pin reinserted to retain the resultant new speed ratio.

Figure 3:
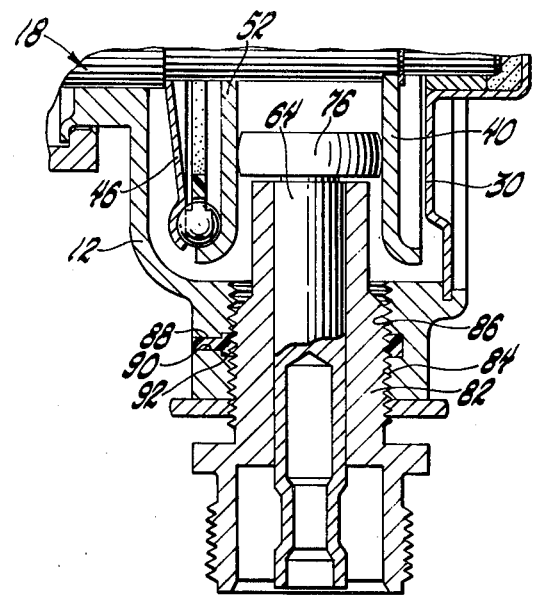
FIG. 3 is a fragmentary cross-sectional view of an adapter unit embodying a modification of a portion of the FIG. 1 structure.

Referring now to FIG. 3, an alternate ratio adjusting means will now be described. A sleeve member 82 has external threads 84 formed thereon for threaded insertion into an internally threaded opening 86 formed in the housing 12, in lieu of the opening 16 of the FIG. 1 structure. Once the desired distance R is established as above, a suitable plastic 88 may be injected into a radially extending hole 90 and an adjacent inner annular groove 92 formed in the housing 12 at an intermediate location along the length of the internally threaded opening 86, for securing the location of the sleeve member 82.

Figure 5:
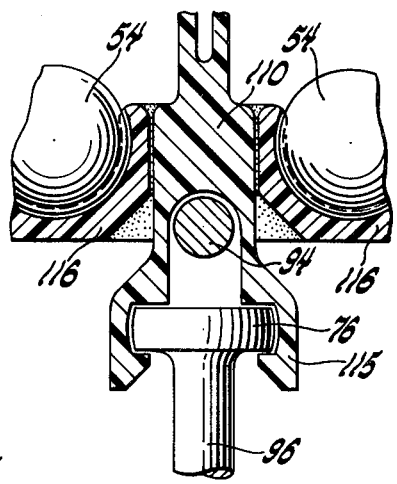
FIG. 5 is a fragmentary cross sectional view taken along the plane of line 5—5 of FIG. 4, and looking in the direction of the arrows.
Figure 4:
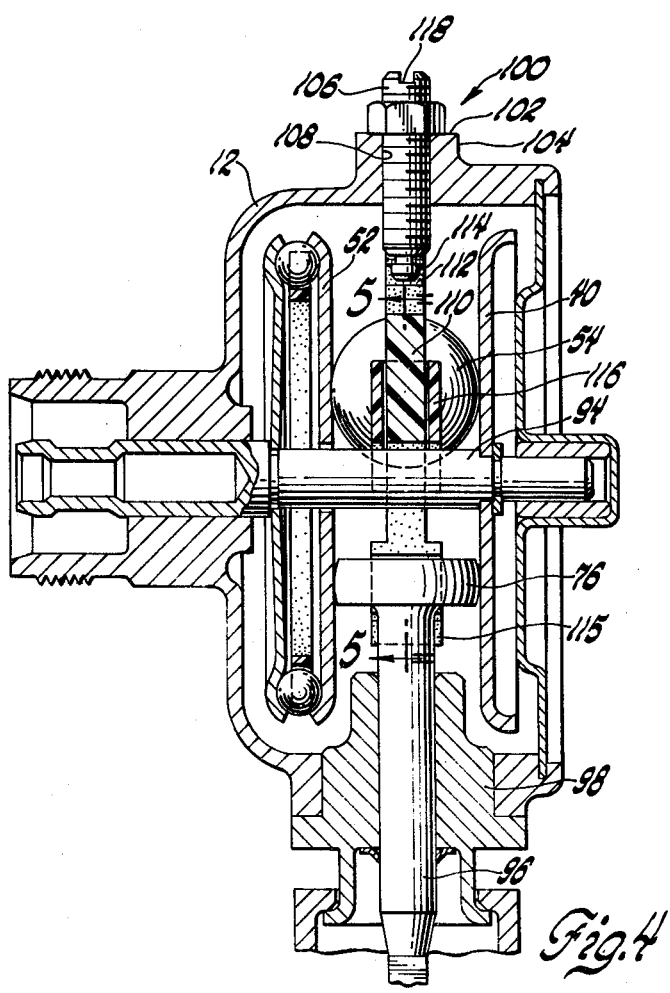
FIG. 4 is a cross-sectional view of an adapter unit embodying a second modification of a portion of the FIG. 1 structure.

In the arrangement shown in FIGS. 4 and 5, it may be noted that the races 40 and 52 are mounted on an output shaft 94 in the same manner as described above relative to the input shaft 18 of FIG. 1, and the roller 76 is mounted on the inner end of an input shaft 96 rotatably mounted and axially retained in a fixed sleeve member 98. A screwdriver type adjustment mechanism 100 is operatively connected between a reference surface 102 formed on a boss 104 on the outer wall of the housing 12 and the drive roller 76. The adjustment mechanism 100 includes a threaded stud 106 mounted in a threaded opening 108 formed in the wall of the housing 12 at the center of the boss 104. A resilient yoke member 110 has one end 112 thereof snapped over a shoulder 114 formed on the inner end of the stud 106 (FIG. 4), and the other end 115 thereof snapped over the roller 76 (FIG. 5), with the central portion thereof extended between the two spacer balls 54 and a two-piece cage 116 for the latter. Thus, it may be noted that as the stud 106 is rotated by an appropriate tool, such as a screwdriver, inserted in a lateral slot 118 formed in the exposed end of the stud 106, the drive roller 76 will be raised or lowered, thereby changing its position along the adjacent surface of the race 40 and, hence, the radius R and the corresponding input/output speed ratio.

Figure 6:
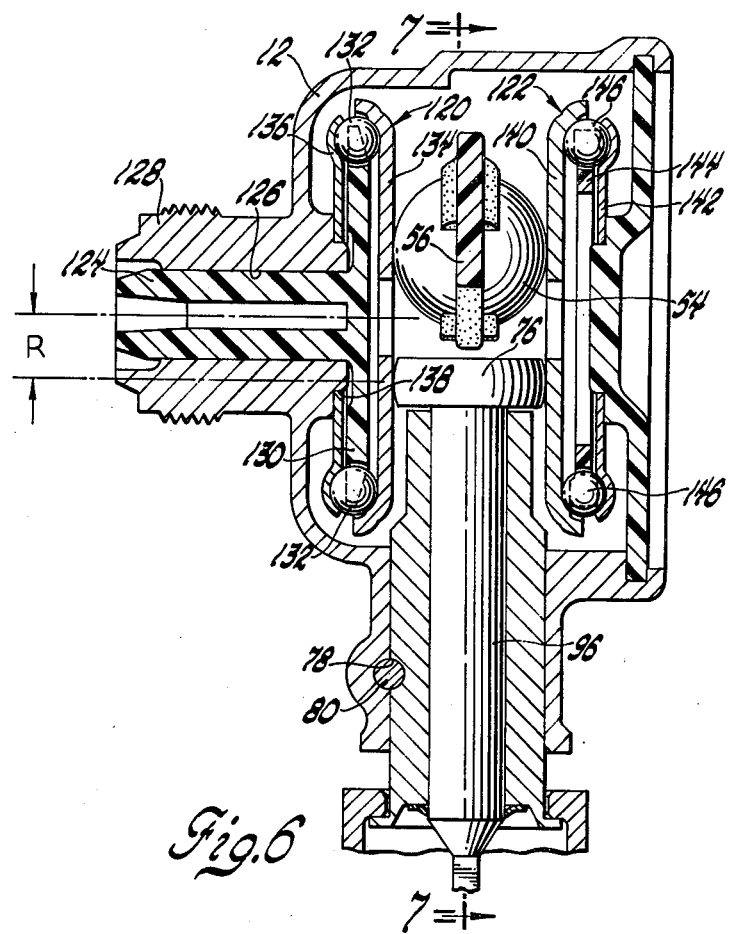
FIG. 6 is a cross sectional view of an alternate embodiment of the invention.
Figure 7:
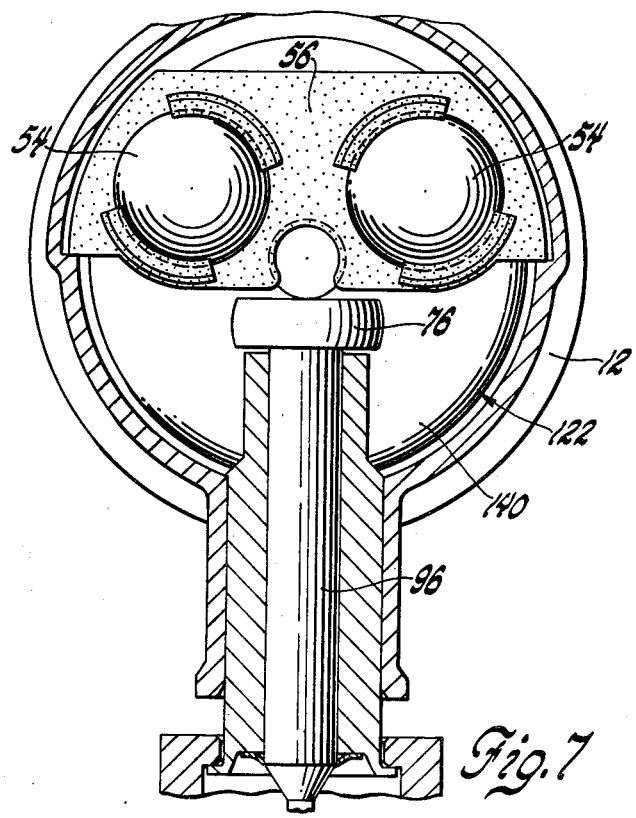
FIG. 7 is a cross-sectional view taken along the plane of line 7—7 of FIG. 6, and looking in the direction of the arrows.

While the ratio range indicated above is generally applicable to rear wheel drive vehicles, for most front wheel drive vehicles the speed ratio required is somewhat greater than the above-mentioned speed reduction, or in the range of 1.8 to 3.5:1. This is due to the input to the adapter unit 10 being more readily taken from the governor drive means which, in turn, is located downstream of the rear axle reduction. Accordingly, an initial 2:1 speed ratio is desirable to supplement the available variable speed ratio. This is accomplished in the arrangement shown in FIGS. 6 and 7.

In the latter embodiment, the drive roller 76 is frictionally mounted between first and second planetary units 120 and 122, respectively, on the input shaft 96, similar to the FIG. 4 arrangement. An output shaft 124 is rotatably mounted in an opening 126 formed through an externally threaded connector extension 128 formed on the housing 12, and terminates just inside the opening 126, rather than extending across the interior of the housing 12 as in the case of the FIG. 4 structure.

A flange 130 is formed on the inner end of the output shaft 124 and serves as a carrier for balls 132 of the first planetary unit 120. The balls 132 are frictionally confined between an input race 134 and a resilient reaction race 136 fixed to a seat 138 formed on an inner surface of the housing 12, the latter race 136 being preloaded by the drive roller 76 tractionally mounted against the input race 134.

The second planetary unit 122 includes a second input race 140, a second resilient reaction race 142 fixed to an opposite inner surface of the housing 12, and an intermediate carrier 144 and associated balls 146 frictionally confined between the races 140 and 142. The fixed race 142 is also preloaded by the drive roller 76 tractionally mounted against the second input race 140. A cage 56 and spacer balls 54 are also mounted between the input races 134 and 140, similar to the FIG. 1 arrangement.

In operation, it is apparent that the additional 2:1 factor referred to above is accomplished by virtue of the balls 132 being frictionally confined between the fixed race 136 and the input race 134 being driven by the drive roller 76, the carrier 130 being thus driven at one-half the speed of the input race 135. This factor, coupled with the input/output speed ratio range available through a change in the distance R by moving the drive roller 76 in or out as explained above, serves to make possible an overall input/output speed ratio range, in the order of 1.8 to 3.5:1, as required for most governor drive applications.

Once set, the roller 76 position may be secured by the opening 78/pin 80 technique of the FIG. 1 structure or by either of the techniques shown in FIGS. 3 and 4.

It should be apparent that the above described arrangements provide an efficient, economical, and compact adapter means for making possible the selection of an infinite number of input/output speed ratios within predetermined limits between transmission output shafts or governor drive shafts and vehicular speedometer drive units.

It should also be apparent that the input and output shafts may be interchanged with respect to their connections with the interior races and rollers, and that while initial 1:1 and 2:1 reduction ratios have been described, other constant speed ratios may be incorporated in conjunction with the variable ratio range made possible by the invention.

While several embodiments of the invention have been shown and described, other modifications thereof are possible.

What is claimed is:

1. For use with a rotatable transmission output, a drive adapter comprising a housing, input and output shafts extending into said housing rotatably mounted in respective openings formed therein, said input shaft having an end extending from said housing adapted to be operatively connected to said transmission output, drive means formed on the exposed end of said output shaft for operatively connecting said output shaft to a member to be driven, a first race forming drive disc means secured to said input shaft in said housing, a belleville spring having a central opening through which said input shaft extends, said belleville spring having an annular shoulder around said central opening, mounted against a shoulder formed on said input shaft within said housing a predetermined distance from said first race, a second race mounted around said input shaft intermediate said belleville spring and said first race, said belleville spring having an outer annular track adjacent the outer circumference thereof, a plurality of spherical thrust bearings for receiving and transmitting the axial spring force of said belleville spring, said bearings being mounted in said outer annular track of said belleville spring and confined between said belleville spring and said second race, a plurality of spacer balls rotatably mounted between said first and second races against the force of said belleville spring, cage means disposed between said races rotatably supporting said spacer balls in said housing, said housing having shoulder means engaging said cage means to retard said cage means from rotation, a roller formed on the inner end of said output shaft and frictionally confined in a traction-drive relationship between said first and second races by said belleville spring, and ratio adjustment means mounted in a wall of said housing and operatively connected to said roller for positioning said roller along the adjacent surfaces of said first and second races and thereby establishing the resultant input/output speed ratio of said shafts.

2. For use with a predetermined rotatable driving member, a drive adapter comprising a housing, a pair of openings formed in said housing, a sleeve member mounted in one of said openings, input and output shafts rotatably mounted in the other of said openings and in said sleeve member, said input shaft being operatively connected to said driving member, drive means formed on the exposed end of said output shaft for operatively connecting said output shaft to a member to be driven, a first race forming drive disc means secured to one of said shafts in said housing, a belleville spring having an inner opening at the apex thereof, said opening being formed by an inner annular edge, said annular edge being mounted against a shoulder formed on said one of said shafts within said housing a predetermined distance from said first race, a second race mounted in said housing around said one of said shafts intermediate said belleville spring and said first race, a plurality of spherical thrust bearings contacted by said belleville spring and confined between said belleville spring and said second race, said thrust bearings transmitting axial force exerted by said spring to said second race, a pair of spacer balls rotatably mounted between said first and second races for positioning said races at a predetermined distance from one another against the force of said belleville spring, cage means secured to and fixedly mounted within said housing for supporting said spacer balls for rotation between said races, a roller formed on the inner end of the other of said shafts and frictionally confined in a transaction-drive relationship between said first and second races by said belleville spring, and selective position setting means mounted in a wall of said housing and operatively connected to one of said sleeve member of said drive roller for establishing the position of said roller along the adjacent surfaces of said first and second races and for establishing a predetermined input/output speed ratio for said input and output shafts.

* * * * *